United States Patent
Marini et al.

(10) Patent No.: US 9,751,631 B2
(45) Date of Patent: Sep. 5, 2017

(54) REDUCED PROFILE LEGREST FOR A SEAT

(71) Applicant: PAC Seating Systems, Inc., Palm City, FL (US)

(72) Inventors: Hector Noel Marini, Palm City, FL (US); Michael Edward Boyle, Port St. Lucie, FL (US)

(73) Assignee: PAC SEATING SYSTEMS, INC., Palm City, FL (US)

( * ) Notice: Subject to any disclaimer, the term of this patent is extended or adjusted under 35 U.S.C. 154(b) by 91 days.

(21) Appl. No.: 14/694,687

(22) Filed: Apr. 23, 2015

(65) Prior Publication Data
US 2016/0311537 A1 Oct. 27, 2016

(51) Int. Cl.
*A61G 5/12* (2006.01)
*B64D 11/06* (2006.01)
*B60N 2/44* (2006.01)
*A47C 7/50* (2006.01)

(52) U.S. Cl.
CPC ........ *B64D 11/0643* (2014.12); *B60N 2/4495* (2013.01); *B64D 11/064* (2014.12); *A47C 7/506* (2013.01); *A61G 5/12* (2013.01)

(58) Field of Classification Search
CPC .................................. A47C 7/506; A61G 5/12
USPC .......................................... 297/423.1–423.46
See application file for complete search history.

(56) References Cited

U.S. PATENT DOCUMENTS

| | | | | |
|---|---|---|---|---|
| 283,111 A | * | 8/1883 | Isberg ...................... | 297/423.19 |
| 3,099,487 A | * | 7/1963 | Knabusch ............ | A47C 1/0345 |
| | | | | 297/423.19 |
| 3,695,701 A | * | 10/1972 | Knabusch .............. | A47C 7/506 |
| | | | | 297/269.1 |
| 3,865,432 A | | 2/1975 | Rogers, Jr. et al. | |
| 6,692,078 B2 | | 2/2004 | Pham et al. | |
| 7,121,627 B2 | * | 10/2006 | Gaikwad ................ | A47C 7/506 |
| | | | | 297/423.28 |
| 8,746,802 B1 | * | 6/2014 | Delmestri .............. | A47C 7/506 |
| | | | | 297/423.19 |
| 8,985,694 B2 | * | 3/2015 | Fischer ................ | A47C 1/0355 |
| | | | | 297/423.19 |

(Continued)

FOREIGN PATENT DOCUMENTS

| EP | 2662239 A1 | 11/2013 |
|---|---|---|
| EP | 2778066 A2 | 9/2014 |

OTHER PUBLICATIONS

Written Opinion of the International Searching Authority issued on Oct. 27, 2016 during the prosecution of PCT/US2016/026578.

(Continued)

*Primary Examiner* — Syed A Islam
(74) *Attorney, Agent, or Firm* — Troutman Sanders LLP

(57) ABSTRACT

A reduced profile legrest system has a legrest frame having at least two opposing edges, a width, and a centerline being a point that is half of the width. Also, at least two linkage mechanisms can each deploy and retract the legrest frame. Each linkage mechanism can have a first end and a second end. The second ends of the linkage mechanisms are attached to the legrest frame, and are offset from at least one of the two opposing edges toward the centerline. The offset can be a distance between the second ends and is approximately 15% to approximately 50% of the width. The offset can also be a distance between the second end and the centerline and is greater than 0.0 and less than or equal to 0.70 of the first distance.

11 Claims, 10 Drawing Sheets

(56) References Cited

U.S. PATENT DOCUMENTS

| | | | | |
|---|---|---|---|---|
| 2004/0256902 A1* | 12/2004 | LaPointe | ............... | A47C 1/0345 |
| | | | | 297/423.19 |
| 2005/0081294 A1 | 4/2005 | Wolters | | |
| 2006/0158015 A1 | 7/2006 | Tsuji | | |
| 2009/0152927 A1* | 6/2009 | Griepentrog | ......... | A47C 17/175 |
| | | | | 297/423.19 |
| 2010/0102612 A1* | 4/2010 | Walters | ................. | A47C 7/506 |
| | | | | 297/354.1 |
| 2010/0244534 A1* | 9/2010 | Driessen | ............. | B60N 2/4495 |
| | | | | 297/423.35 |
| 2012/0248831 A1 | 10/2012 | Garland | | |
| 2013/0169018 A1 | 7/2013 | Fischer | | |
| 2013/0300177 A1* | 11/2013 | Yamada | ................. | B60N 2/44 |
| | | | | 297/423.19 |
| 2014/0021765 A1* | 1/2014 | Suzuki | ................. | B60N 3/063 |
| | | | | 297/423.19 |
| 2014/0084659 A1 | 3/2014 | Archambault et al. | | |
| 2014/0333099 A1 | 11/2014 | Lu et al. | | |
| 2015/0028647 A1* | 1/2015 | LaPointe | ................ | A47C 3/02 |
| | | | | 297/423.29 |

OTHER PUBLICATIONS

International Search Report dated Jun. 21, 2016 during the prosecution of PCT/US2016/026578.

* cited by examiner

REDUCED PROFILE LEGREST FOR A SEAT

FIELD OF THE INVENTION

The present invention relates to a vehicle seat, preferably an airplane seat, with legrest linkages set substantially in from the outside of the legrest support.

BACKGROUND

Certain aircraft passenger seats have individual seat components, including a legrest and a backrest. These seat components can be moved by an actuating device triggered by a hand-operated actuator which can adjust the seat to the requirements of the seat occupant.

Typical legrests have scissor-type linkages to allow the legrest to be stored and positioned out of the way of the user, and then extended to support the user's feet and legs. For the maximum amount of stability, the ends of the linkages are disposed approximately at the full width of the support cushion. However, this puts the linkages very close to the outside of the seat. This position increases the chance of a user snagging clothing or skin in the linkages or, at a minimum, coming into contact with the linkages and smearing grease on the user or user's clothing.

Most fabricators of the legrests accept these difficulties with the linkages as a tradeoff for stability. Even more important for vehicle seats, are weight constraints, so stiffer and stronger materials to compensate for the lack of stability are usually frowned upon due to their additional weight.

Thus, there is a need for a stable legrest design that has a reduced exposure profile than existing solutions.

SUMMARY

The teachings herein alleviate one or more of the above noted problems with the legrest of vehicle seats, specifically aircraft seats. One example of a vehicle seat can include a seat bottom frame having a front, a back opposite the front, and it encloses a volume. A seat back frame can be pivotally connected to the back of the seat bottom frame, and a seat legrest can be pivotally connected to the front of the seat bottom frame. The seat legrest can have a legrest frame having a width and at least two linkage mechanisms, each deploying and retracting the legrest frame, and each having a first end and a second end. There can be an attachment distance, which can be a distance between the second ends of the linkage mechanisms. In an example, the first ends of the linkage mechanisms are attached to the seat bottom frame, the second ends of the linkage mechanisms are attached to the legrest frame; and the attachment distance is approximately 15% to approximately 50% of the width.

In other examples, the attachment distance can be approximately 30% to approximately 40% of the width, or even approximately 37% of the width. Also, the legrest frame can further include a centerline being a point that is half of the width, and the second ends are spaced equidistant and opposite from the centerline.

A different example of a vehicle seat can include a seat bottom frame having a front, a back opposite the front, and it encloses a volume. A seat back frame can pivotally connect to the back of the seat bottom frame while a seat legrest can pivotally connect to the front of the seat bottom frame. The seat legrest can include, in one example, a legrest frame having at least one edge and a width with a centerline being a point that is half of the width. Included can be a first distance between the at least one edge and the centerline and a linkage mechanism, pivotably deploying and retracting the legrest frame, and having a first end and a second end. It further has a linkage separation distance as a distance between the second end of the linkage mechanism and the centerline. Examples include the first end of the linkage mechanism attached to the seat bottom frame, the second end of the linkage mechanism attached to the legrest frame, and the linkage separation distance is greater than 0.0 and less than or equal to 0.70 of the first distance.

Other examples of the vehicle seat include a second linkage mechanism, pivotably deploying and retracting the legrest frame, and having a second linkage mechanism first end and a second linkage mechanism second end. Also, a second linkage mechanism linkage separation distance can be a distance between the second linkage mechanism second end and the centerline. Then, the second linkage mechanism first end is attached to the seat bottom frame, the second end is attached to the legrest frame, and the second linkage mechanism linkage separation distance is greater than 0.0 and less than or equal to 0.70 of the first distance. Additionally, the second linkage mechanism linkage separation distance is approximately equal to the linkage separation distance.

An example of a reduced profile legrest system has a legrest frame having at least two opposing edges and a width along with a centerline being a point that is half of the width. Included are at least two linkage mechanisms, each deploying and retracting the legrest frame, and each having a first end and a second end. The second ends of the linkage mechanisms are attached to the legrest frame, and each of the second ends of the linkage mechanisms are offset from at least one of the two opposing edges toward the centerline.

The example can also include an attachment distance as a distance between the second ends of the linkage mechanisms, the offset is equal to the attachment distance, and the attachment distance is approximately 15% to approximately 50% of the width. Further, there can be a first distance which is a distance between at least one of the two edges and the centerline and a linkage separation distance as a distance between the second end of the linkage mechanism and the centerline. In an example, the offset is equal to the linkage separation distance, and the linkage separation distance is greater than 0.0 and less than or equal to 0.70 of the first distance.

Another example of a reduced profile legrest as above, where at least one of the linkage mechanisms has an attachment section attached to the legrest frame, a first paired link rotatably attached to the attachment section, a seat connector link rotatably attached to the first paired link, and a first stabilizer bar, extending from the at least one linkage mechanism to the other linkage mechanism, rotatable attached to the first paired link and the seat connector link.

One of the linkage mechanisms can also include a second paired link rotatably attached to the attachment section, the seat connector link, and the first stabilizer bar, an actuation link rotatably attached to the second paired link, and a second stabilizer bar, extending from the at least one linkage mechanism to the other linkage mechanism, rotatable attached to the second paired link and the actuation link. Further, an example can also have a third stabilizer bar, extending from the at least one linkage mechanism to the other linkage mechanism, rotatable attached to the seat connector link.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

This invention is described with particularity in the appended claims. The above and further aspects of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

The drawing figures depict one or more implementations in accord with the present teachings, by way of example only, not by way of limitation.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, and/or components have been described at a relatively high-level, without detail, in order to avoid unnecessarily obscuring aspects of the present teachings.

Figure 1:
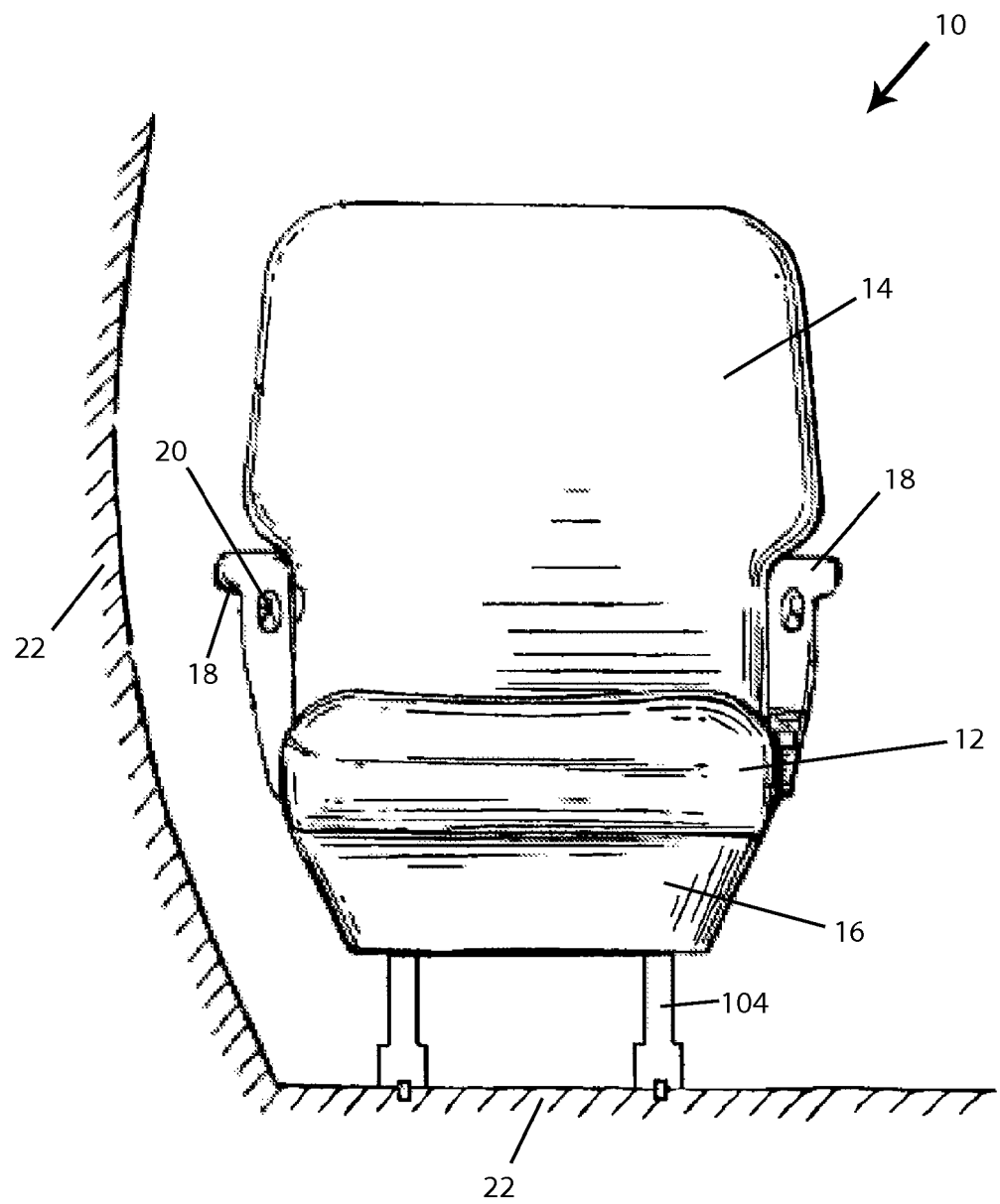
FIG. 1 is a front view of an aircraft seat of the present invention.
Figure 2:
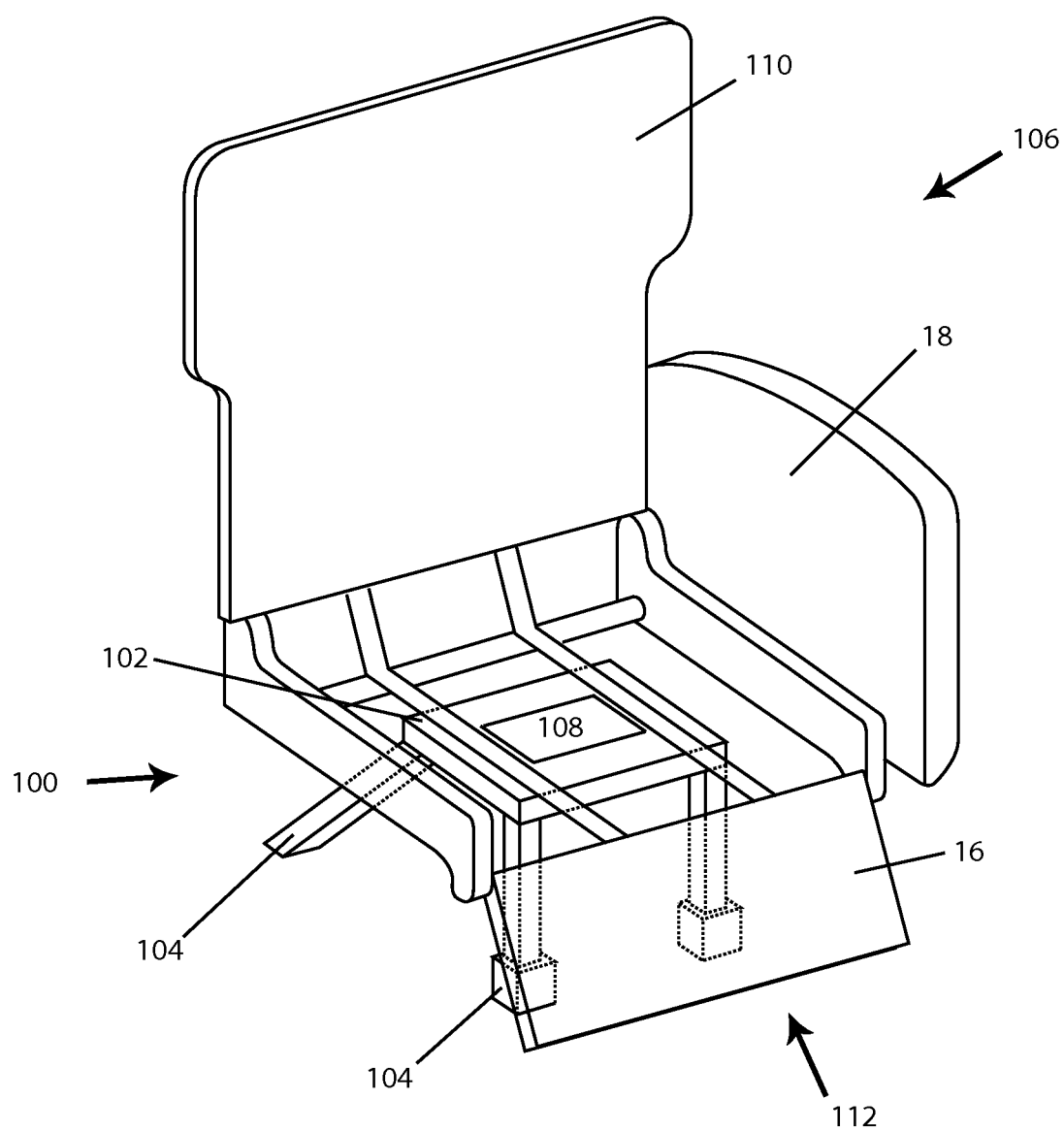
FIG. 2 is a non-upholstered, partially cut-away, top-front-right side perspective view of an aircraft seat of the present invention.

FIGS. 1 and 2 illustrate a vehicle seat 10 that includes an upholstered seat bottom 12, an upholstered seat back 14, and an upholstered legrest 16. The vehicle seat 10 can also be provided with a pair of armrests 18 and one or both of them can include a user operated seat reclining/pivoting/legrest control 20. When the seat control 20 is actuated the seat back 14, legrest 16 and/or the seat bottom 12 can be reclined, extended, tracked, or rotated.

The seat 10 has a seat bottom frame 100 which includes a seat base 102 and seat supports 104 which are fixed to the floor of a vehicle body 22. Mounted to the seat bottom frame 100 can be the seat top frame 106 to complete the seat 10. The seat top frame 106 has a seat frame 108 on which can be mounted the upholstered seat bottom 12. Attached to one side of the seat frame 108 can be the seat back frame 110. On the opposite side from the seat back frame 110 can be the legrest 16, mounted to either the seat bottom frame 100 or the seat top frame 108. In examples, a "front" 112 of the seat base or frame 102, 108 can be defined as the position where the seat 10 is typically facing in the aircraft during takeoff and landing or arbitrarily where the legrest 16 is disposed. Thus, for orientation, the legrest 16 can be disposed on the "front" of the seat base/frame 102, 108, and the seat back frame 110 can be disposed on the "back" of the seat frame 108.

In an example, the seat back frame 110 can be pivotally connected and can pivot down at any angle from an upright position, i.e. approximately perpendicular to the seat frame 108 to a lay flat position, i.e. approximately parallel to the seat frame 108. In addition to pivoting the seat back frame 110, a passenger can also extend the legrest 16.

Figure 3:
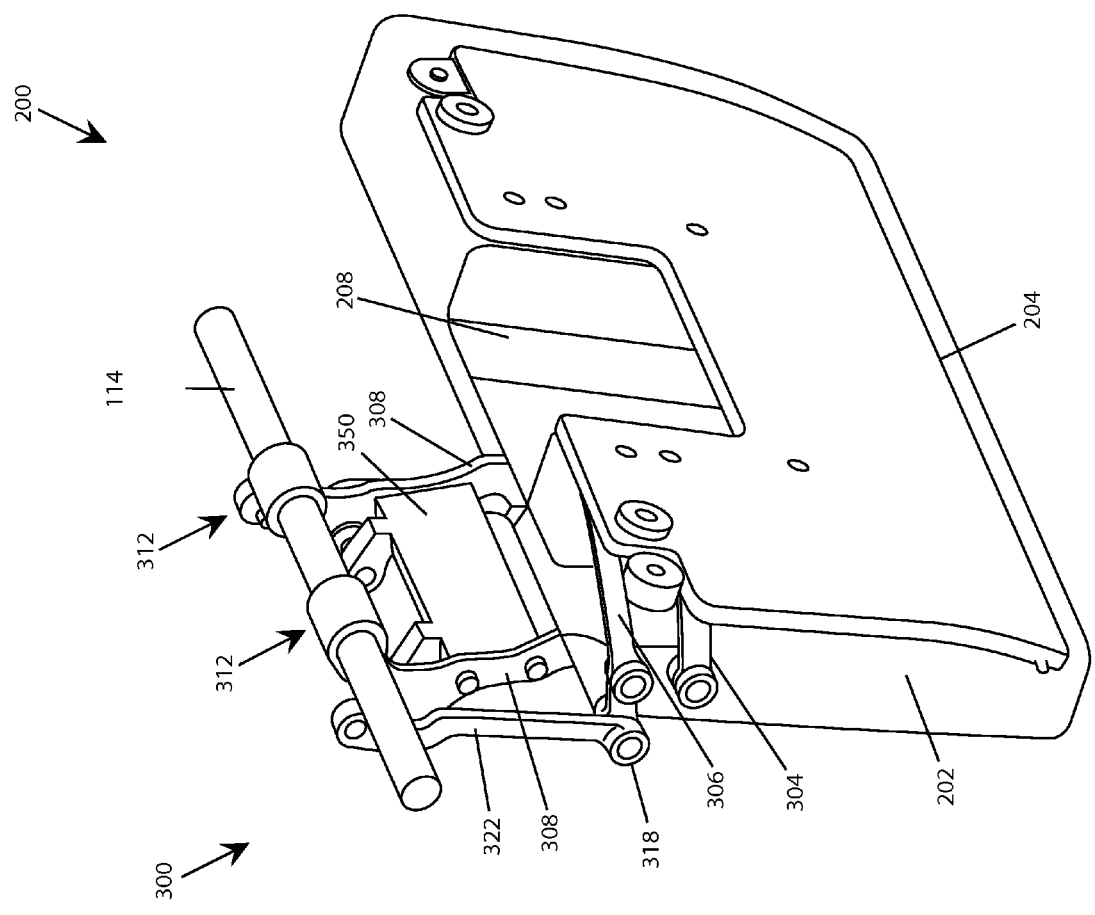
FIG. 3 is a top, right, partially sectioned prospective view of an example of a legrest system of the present invention.
Figure 4:
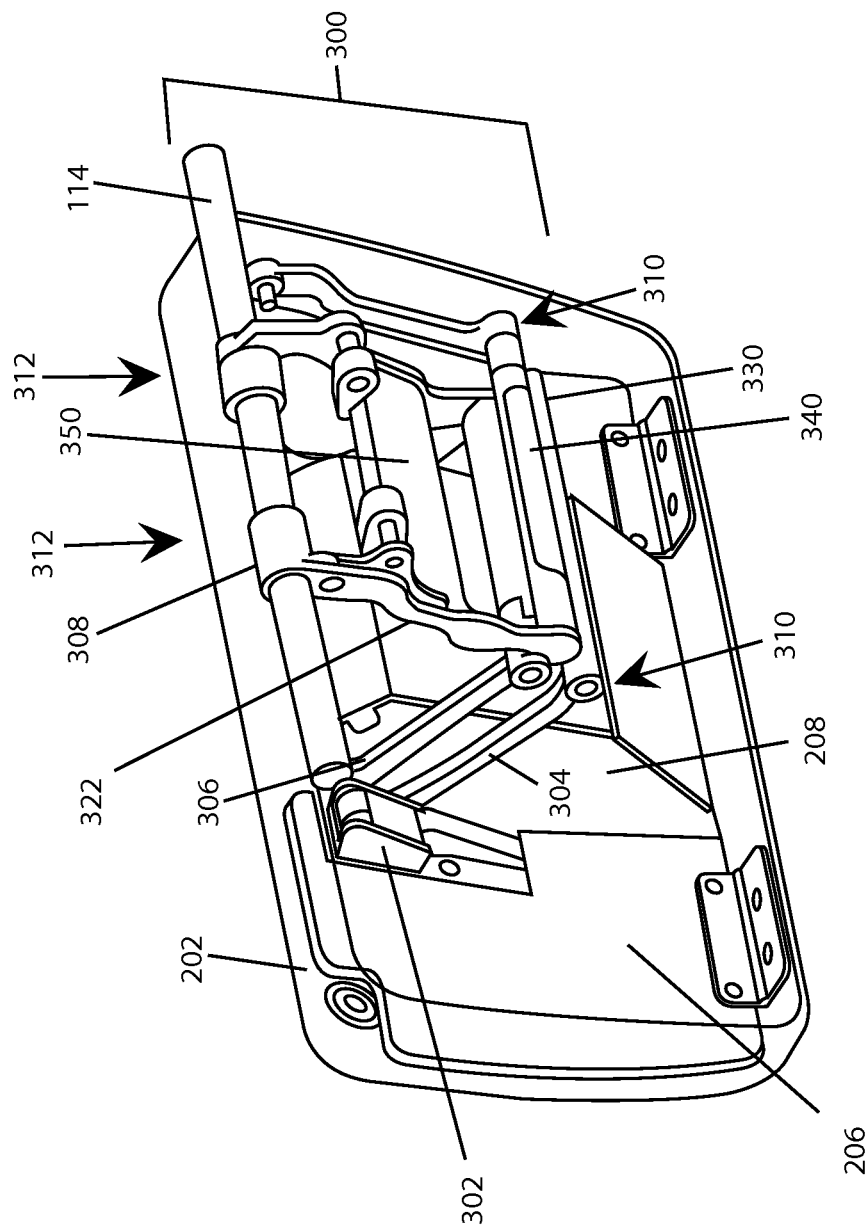
FIG. 4 is a back, left prospective view of another example of the legrest.

FIGS. 3-b illustrate the upholstered legrest 16 can include a legrest system 200 which includes a legrest frame 202 and a linkage mechanism 300. The legrest frame 202 can be a single piece or multiple pieces to include, leg, calf and foot supports. As illustrated in FIG. 3, an example of the legrest frame 202 can be stowed in an approximately vertical position i.e. approximately perpendicular to the seat frame 108. Stated another way, the stored legrest frame 202 can depend in the opposite direction of the seat back frame 110. Once the legrest frame 202 is deployed, it can support a portion, to the entirety, of the user's legs. In the deployed position the legrest frame 202 can be approximately parallel to the seat frame 108.

The seat frame 108, seat back frame 110, and the legrest system 200 can work in concert so that the entire seat 10 can enter a "sleeping configuration" in which the upholstered surfaces 12, 14, 16 are all approximately horizontal and can form an arc of approximately 180°. Note that as one or both of the seat back frame 110 and the legrest frame 202 move, the seat frame 108 may translate. Additionally, the seat top frame 108, in some examples, can rotate about an axis when in the fully upright position or when one or both of the seat back frame 110 is reclined and the legrest frame 202 is deployed.

The legrest frame 202 is supported and translated between the stored and extended positions by the linkage mechanism 300. The legrest frame 202 can have a top surface 204 and a bottom surface 206. The top surface 204 can be upholstered or support padding or an upholstered pad. The bottom surface 206 engages with the linkage mechanism 300 and can also include an emergency supply storage compartment 208. The compartment 208 is typically mounted to the bottom surface 206 and can contain certain emergency supplies, including a life vest (not illustrated). The compartment 208 is typically left open on one side and allows the users to extract the emergency supplies easily when the legrest system 200 is partially deployed.

Figure 6:
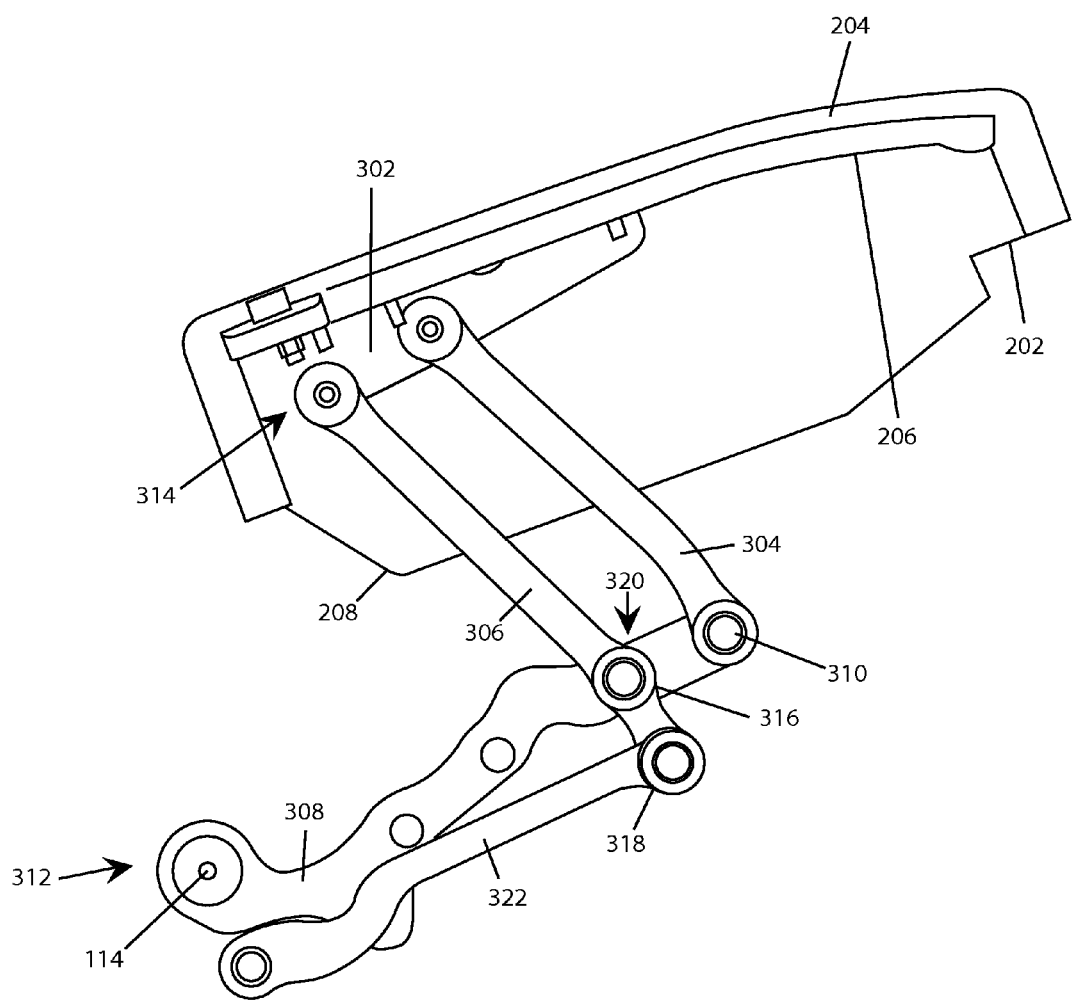
FIG. 6 is a right side, partially sectioned view of yet another example of the legrest partially extended.
Figure 7:
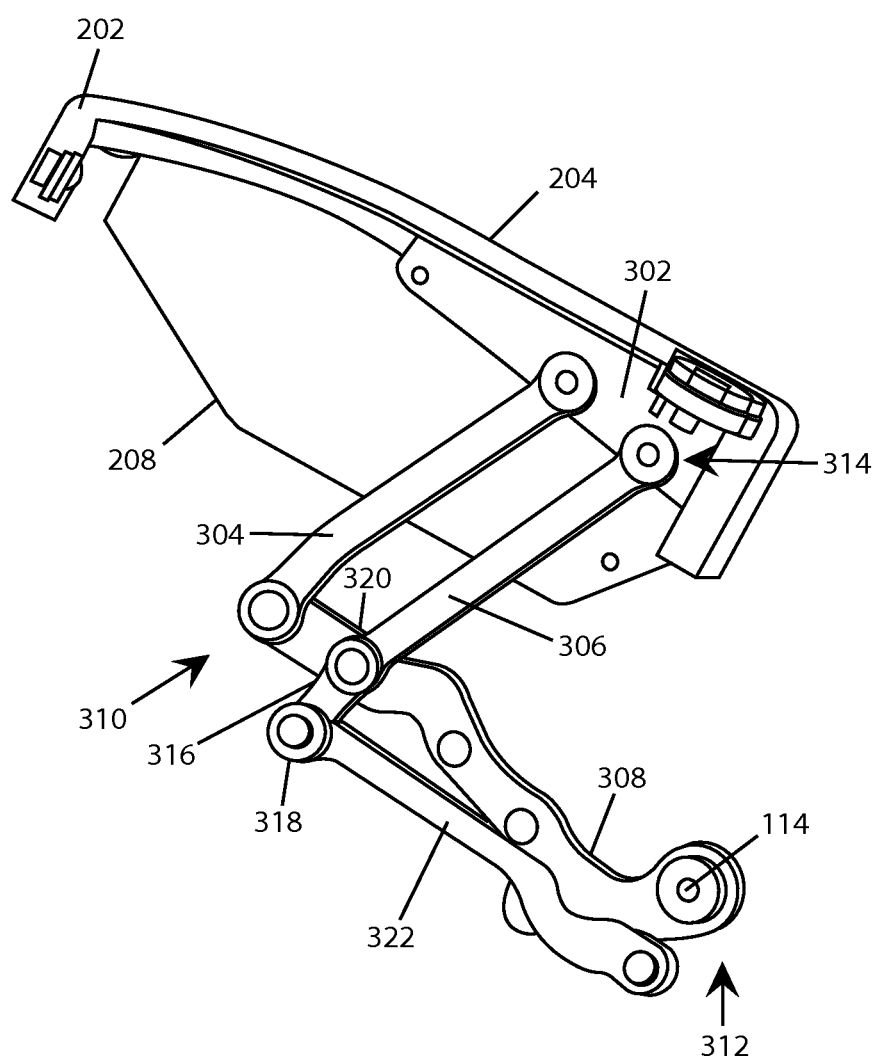
FIG. 7 is a left side, partially sectioned view of a yet further example of the legrest partially extended.

The linkage mechanism 300 comprises a number of different links to deploy and retract the legrest frame 202. Note that the linkages on the left and right side the legrest frame 202 can be generally identical, except as needed for the specific side of the legrest frame 202, as is illustrated in FIGS. 6 and 7. Further, some or all of the connections between the links can be freely piviotable, so that each link can pivot/spin/rotate about the other in a full or limited degree of freedom.

Starting from the legrest frame 202, there is linkage attachment section 302. This section 302 attaches the linkage mechanism 300 to the legrest frame 202. Next can be the first and second paired links 304, 306 linking the attachment section 302 with a seat connection link 308. A first end 310 of the seat connection link 308 can be attached to the first paired link 304. At the opposite, second end 312, the seat connection link 308 can be attached to seat frame 108, as illustrated with a single connection member 114.

The second paired link 306 can have a legrest engagement section 314, a seat link engagement section 316, and an actuation link engagement section 318 opposite the legrest engagement section 314. The legrest engagement section 314 can be where the second paired link 306 connects to the attachment section 302, or in other examples, connects directly to the legrest frame 202. The seat link engagement section 316 can be disposed between legrest engagement section 314 and the actuation link engagement section 318. In one example, the seat link engagement section 316 can be disposed closer to the actuation link engagement section 318. The seat link engagement section 316 can be where the second paired link 306 joins the seat connection link 308.

The seat connection link 308 can have a second paired link engagement section 320. The second paired link engagement section 320 can be where the second paired link 306 engages the seat connection link 308. The second paired link engagement section 320 can be disposed between the first and second ends 310, 312. In one example, the second paired link engagement section 320 can be disposed closer to the first end 210.

An actuation link 322 can span between the second paired link 306 and a legrest actuation mechanism (not illustrated). The actuation link 322 connects to the second paired link 306 at the actuation link engagement section 318 on the second paired link 306. The actuation link 322 is the link that receives the force to begin the deployment or retraction of the legrest system 200 from the legrest actuation mechanism. The force applied can cause, at the least, the second paired link 306 to pivot about second paired link engagement section 320.

Figure 5:
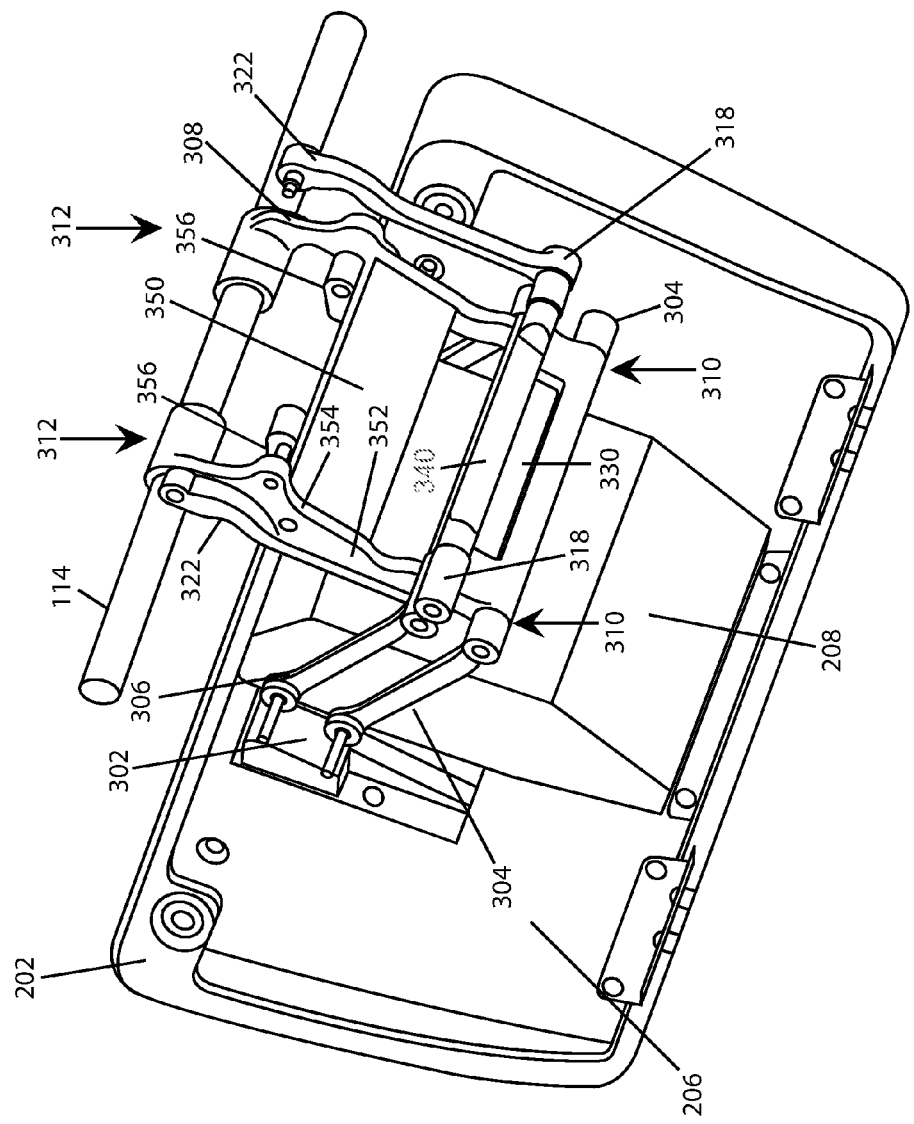
FIG. 5 is a back, left prospective view of a further example of the legrest partially extended.
Figure 8:
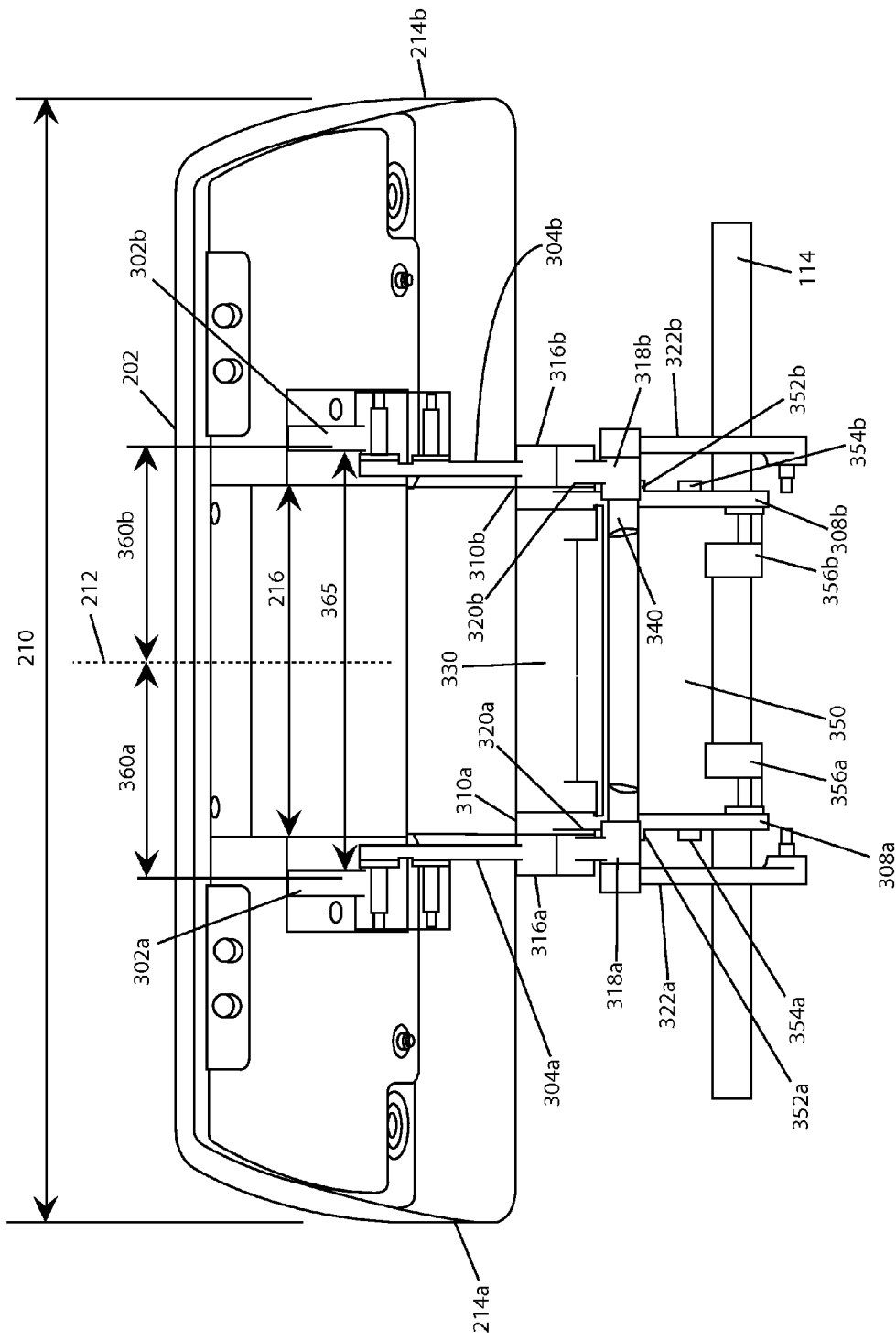
FIG. 8 is a front, bottom prospective view of an example of the legrest system.
Figure 9:
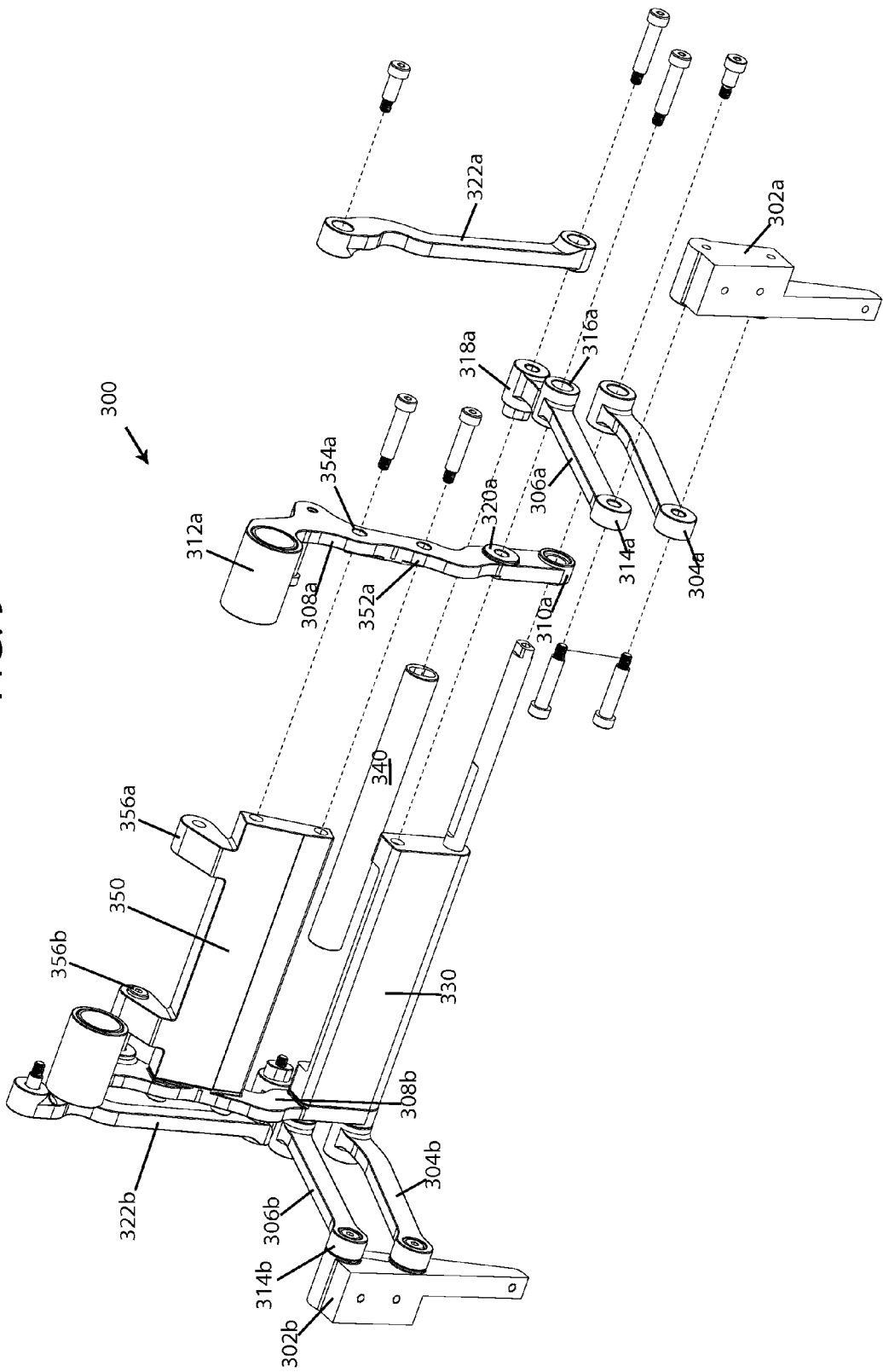
FIG. 9 is an exploded view of the linkages of the legrest system.

As best seen in FIGS. 5, 8 and 9, the linkage mechanism can also include stabilizer bars 330, 340, 350, disposed approximately perpendicular to the other linkages and span between the left and right pairs of links. In FIGS. 8 and 9, the right side links as described above, are designated "a" and the left side links are designated "b". A first stabilizer bar 330 can span between the left and right sets of the first and second paired links 304a, 304b, 306a, 306b and the seat connection links 308a, 308b.

The first stabilizer bar 330 can be connected to each set of links at least one point to the linkages 304a, 304b, 306a, 306b, 308a, 308b. In one example, the first stabilizer bar 330 can be connected at the first end 310a, 310b. The engagement can be coincidental, so that the engagement device (e.g. a pin) that connects the first paired link 304a, 304b to the seat connection link 308a, 308b also can connect the both to the first stabilizer bar 330, thus the three members can share a common pivot point. The first stabilizer bar 330 can also be connected at the seat link engagement section 316a, 316b which is also the second paired link engagement section 320a, 320b to both the second paired link 306a, 306b and the seat connection link 308a, 308b. As above, this connection can be coincidental.

In another example, a second stabilizer bar 340 can be connected to the second paired link 306a, 306b and the actuation link 322a, 322b. The three 306, 308, 340, in one example, can be connected at the actuation link engagement section 318a, 318b. A further example can have a third stabilizer bar 350 connected solely to the seat connection link 308a, 308b. The third stabilizer bar 350 can be connected to the seat connection link 308a, 308b in one or more sections. In one example, the third stabilizer bar 350 is connected at a first and a second stabilizer connection section 352, 354 (352a, 352b, 354a, 354b). In one example, the first stabilizer connection section 352 is disposed apart from the second stabilizer connection section 354. However, both stabilizer connection sections 352, 354 can be disposed between the second end 312 and the second paired link engagement section 320.

In a further example the third stabilizer bar 350 can be connected at a third stabilizer connection section 356. This section 356 can be disposed between the second stabilizer connection section 354 and the second end 312.

The stabilizer bars 330, 340, 350, in one example, can play an important part in stabilizing the legrest system 200. The legrest frame 202 has a width 210 which can be as wide as the seat 10, with or without being upholstered 16, or can be smaller. The width 210 can be measured from the edges 214 of the legrest frame 202 and the center of which defines a centerline 212. Stated differently, the centerline 212 is a point at half the width 210 of the legrest frame 202.

Figure 10A:
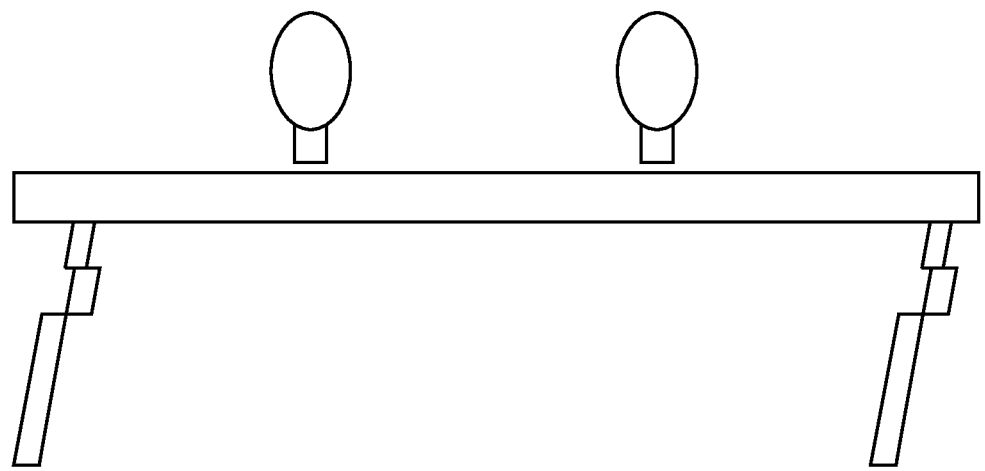
FIGS. 10A and 10B illustrating a prior art legrest and some of its drawbacks.
Figure 10B:
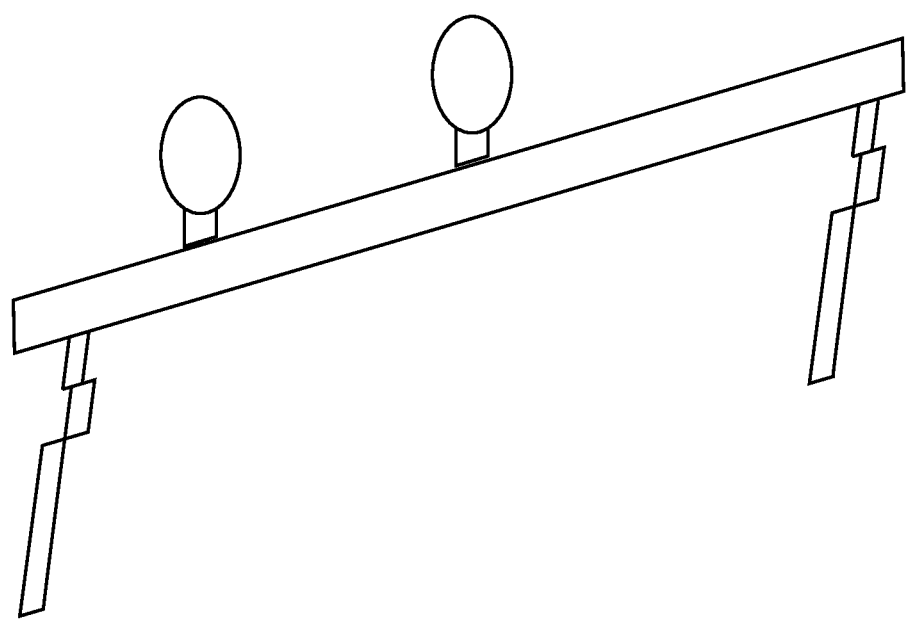

In prior art legrests, the attachment sections, and thus the whole of the linkage mechanisms, are attached to the legrest very close to the edges. This is because when a user uses the legrest, the weight of the user's legs can unevenly load the legrest mechanism if they are unevenly weighted to one side of the centerline. Spacing the attachment of the linkages to the legrest as wide as possible, helps prevents the legrest from tilting, and permits the proper operation of the mechanisms. Part of the prior art problems also arise when the right and left linkages of the prior art are tilted in relation to one another (see FIGS. 10A and 10B)

In one example, the attachments sections 302a, 302b are set in from the edges 214a, 214b and closer to the centerline 212 and are separated from the centerline 212 by a linkage separation distance 360. In unit less measure, if the distance from the centerline 212 to the edge 214 is equal to 1, then the linkage separation distance 360 ("lsd") can be anywhere from 0 to approximately 0.70, or mathematically $0 \leq lsd \leq 0.70$. In one example, lsd 310 can be approximately one of 0.70, 0.66, 0.60, 0.50, 0.40, 0.33 0.30, 0.20 and 0.10 or any range therebetween any of the values. In additional examples, the linkage separation distance 360 is equal for each side. Thus, the linkage separation distance 360a for the right side linkage mechanism 300a is equal to the linkage separation distance 360b for the left side linkage mechanism 300b.

In other examples, one constraint to the attachments sections 302a, 302b approaching the centerline 212 is the size and position of the emergency supply storage compartment 208. The emergency supply storage compartment 208 can also have a width 216 and a total attachment distance 365 between the right side linkage mechanism 300a and the left side linkage mechanism 300b can be approximately the emergency supply storage compartment width 216, given that the attachments sections 302a, 302b are not mounted to the emergency supply storage compartment 208. Another comparison, in yet another example, can be that the total attachment distance 365 is approximately 15% to approximately 50% of the total width 210. An example can be that the total attachment distance 365 is approximately 30% to approximately 40%, with one being approximately 37.5%.

As examples, various features have been mainly described above with respect to an airplane seat. In other implementations, features described herein may be implemented mainly in one or more other types of seats, including automobile seats.

It will also be apparent that various features described above may be implemented in many different forms in the implementations illustrated in the figures. The actual various features are not limiting.

In the preceding specification, various examples have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A vehicle seat comprising:
    a seat bottom frame having a front, a back opposite the front, and enclosing a volume;
    a seat back frame pivotally connected to the back of the seat bottom frame;
    a seat legrest pivotally connected to the front of the seat bottom frame, comprising:
        a legrest frame having a width and a bottom surface;
        at least two linkage mechanisms, each deploying and retracting the legrest frame, and each having a first end and a second end;
        an attachment distance being a distance between the second ends of the linkage mechanisms; and
        a compartment disposed on the bottom surface, between the at least two linkages, and comprising at least one open side,
    wherein the first ends of the linkage mechanisms are attached to the seat bottom frame;
    wherein the second ends of the linkage mechanisms are attached to the legrest frame; and
    wherein the attachment distance is approximately 15% to approximately 50% of the width.

2. The vehicle seat of claim 1, wherein the attachment distance is approximately 30% to approximately 40% of the width.

3. The vehicle seat of claim 1, wherein the attachment distance is approximately 37% of the width.

4. The vehicle seat of claim 1, wherein the legrest frame further comprises a centerline being a point that is half of the width, and
    wherein the second ends are spaced equidistant and opposite from the centerline.

5. A vehicle seat comprising:
    a seat bottom frame having a front, a back opposite the front, and enclosing a volume;
    a seat back frame pivotally connected to the back of the seat bottom frame;
    a seat legrest pivotally connected to the front of the seat bottom frame, comprising:
        a legrest frame having at least one edge, a bottom surface, and a width;
        a centerline being a point that is half of the width;
        a first distance being a distance between the at least one edge and the centerline;
        a linkage mechanism, pivotably deploying and retracting the legrest frame, and having a first end and a second end;
        a linkage separation distance being a distance between the second end of the linkage mechanism and the centerline; and
        a compartment disposed on the bottom surface within the linkage separation distance, and comprising at least one open side,
    wherein the first end of the linkage mechanism is attached to the seat bottom frame;
    wherein the second end of the linkage mechanism is attached to the legrest frame; and
    wherein the linkage separation distance is greater than 0.0 and less than or equal to 0.70 of the first distance.

6. The vehicle seat of claim 5, further comprising:
    a second linkage mechanism, pivotably deploying and retracting the legrest frame, and having a second linkage mechanism first end and a second linkage mechanism second end;
        a second linkage mechanism linkage separation distance being a distance between the second linkage mechanism second end and the centerline,
        wherein the second linkage mechanism first end is attached to the seat bottom frame;
        wherein the second linkage mechanism second end is attached to the legrest frame; and
        wherein the second linkage mechanism linkage separation distance is greater than 0.0 and less than or equal to 0.70 of the first distance.

7. The vehicle seat of claim 6, wherein the second linkage mechanism linkage separation distance is approximately equal to the linkage separation distance.

8. A reduced profile legrest system, comprising:
    a legrest frame having at least two opposing edges and a width;
    a centerline being a point that is half of the width; and
    at least two linkage mechanisms, each deploying and retracting the legrest frame, and each having a first end and a second end, wherein at least one of the linkage mechanisms comprises:
        an attachment section attached to the legrest frame;
        a first paired link rotatably attached to the attachment section;
        a seat connector link rotatably attached to the first paired link;
        a first stabilizer bar, extending from the at least one linkage mechanism to the other linkage mechanism, rotatable attached to the first paired link and the seat connector link;
        a second paired link rotatably attached to the attachment section, the seat connector link, and the first stabilizer bar;
        an actuation link rotatably attached to the second paired link; and
        a second stabilizer bar, extending from the at least one linkage mechanism to the other linkage mechanism, rotatable attached to the second paired link and the actuation link;

wherein the second ends of the linkage mechanisms are attached to the legrest frame, and wherein each of the second ends of the linkage mechanisms are offset from at least one of the two opposing edges toward the centerline.

9. The reduced profile legrest of claim 8, further comprising:

an attachment distance being a distance between the second ends of the linkage mechanisms, wherein the offset is equal to the attachment distance, and wherein the attachment distance is approximately 15% to approximately 50% of the width.

10. The reduced profile legrest of claim 8, further comprising:

a first distance being a distance between at least one of the two edges and the centerline; and a linkage separation distance being a distance between the second end of the linkage mechanism and the centerline, wherein the offset is equal to the linkage separation distance, and wherein the linkage separation distance is greater than 0.0 and less than or equal to 0.70 of the first distance.

11. The reduced profile legrest of claim 8, wherein at least one of the linkage mechanisms further comprises:

a third stabilizer bar, extending from the at least one linkage mechanism to the other linkage mechanism, rotatable attached to the seat connector link.

\* \* \* \* \*